intensity control electrode, and means to control the delay time of each said network with respect to one of said periodic timing pulses of voltage as a function of the magnitude of a separate one of said information voltages.

6. In a multichannel telemetering apparatus, in combination, a plurality of information voltage sources each for supplying a voltage varying in magnitude as a function of a quantity to be measured, a voltage-pulse generator for generating periodic time reference pulses of voltage, circuits separate to each said source coupled to each other and separately coupled to said pulse generator and to said voltage sources for generating recurring groups of information pulses of voltage, each of said information-pulse groups containing one pulse for each of said information voltages, each said circuit including a time-delay device for delaying the generation of each of said information pulses with respect to one of said time-reference pulses by a period of time determined by the magnitude of the information voltage represented by each said information pulse, and utilization means coupled to said circuit and to said pulse generator and responsive both to said time-reference pulses and to said information pulses to produce a desired effect as a function of the time intervals between said time-reference pulses and said information pulses.

7. Apparatus for producing voltage pulses representative of a plurality of voltages from separate voltage sources to facilitate utilization of said voltages, said apparatus comprising a source of recurring time-reference voltage pulses, a group of pulse-output time delay circuits, means coupling said circuits one to each of said voltage sources to control the delay time of each said circuit as a function of the voltage from the source coupled thereto, means coupling said delay circuits together in cascade, means coupling all said delay circuits to said pulse source, a frequency divider network coupled between said pulse source and the first circuit in the cascaded circuit group for supplying pulses to said first circuit at a rate subharmonically related to the occurrence of pulses from said pulse source, the arrangement being such that said first circuit is adapted to be triggered only upon simultaneous receipt of a pulse from said pulse source and a pulse through said divider network while the remaining circuits in said cascaded circuit group each are adapted to be triggered only upon simultaneous receipt of a pulse from said pulse source and a pulse from the preceding circuit in said group, and utilization means coupled to said delay circuits and to said time-reference pulses and responsive to said time reference pulses and to said delayed pulses.

ROBERT H. PETERSON.
HERBERT S. BROADWELL.

References Cited in the file of this patent

UNITED STATES PATENTS

| Number | Name | Date |
|---|---|---|
| 2,412,350 | Morgan | Dec. 10, 1946 |
| 2,444,950 | Nichols | July 13, 1948 |
| 2,468,703 | Hammel | Apr. 26, 1949 |
| 2,471,138 | Bartelink | May 24, 1949 |
| 2,485,343 | Zuschlag | Oct. 18, 1949 |
| 2,497,411 | Krumhansl | Feb. 14, 1950 |
| 2,525,893 | Gloess | Oct. 17, 1950 |

July 14, 1953  L. B. SCOTT  2,645,120
SWIVEL BAIL ADAPTER WEIGHT SENSING DEVICE
Filed April 29, 1949  4 Sheets-Sheet 1

LYLE B. SCOTT,
INVENTOR.

BY Lyon&Lyon
ATTORNEYS

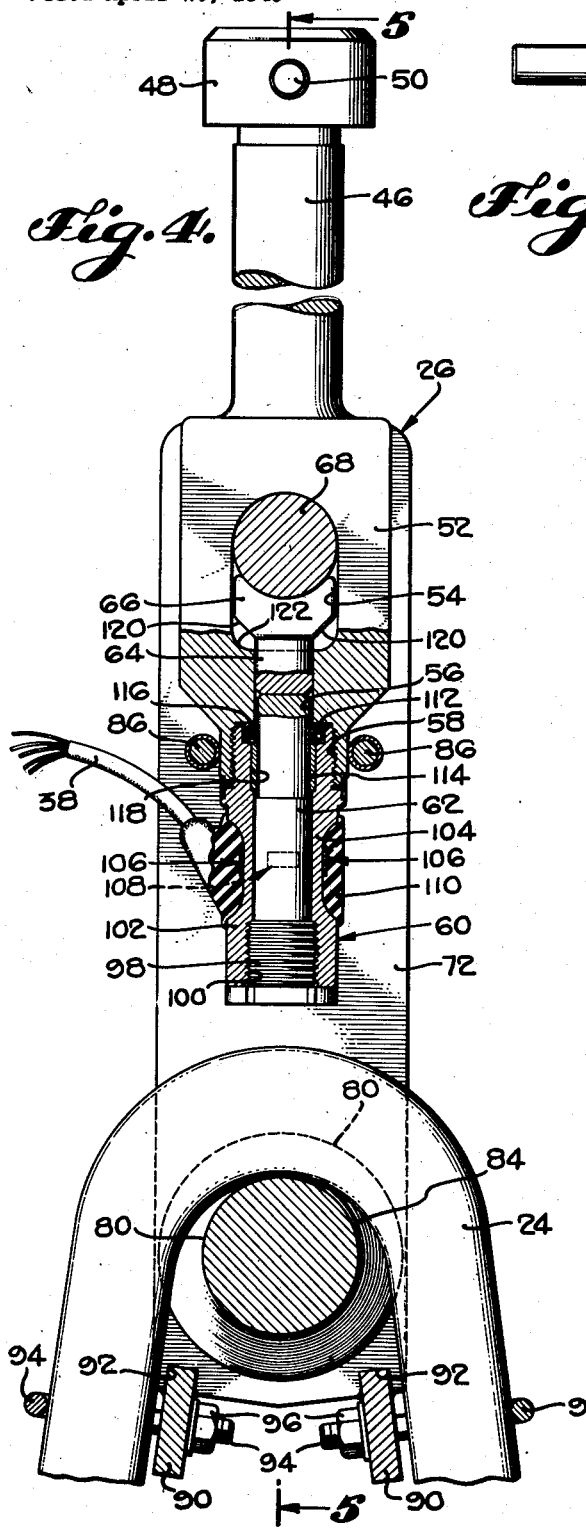
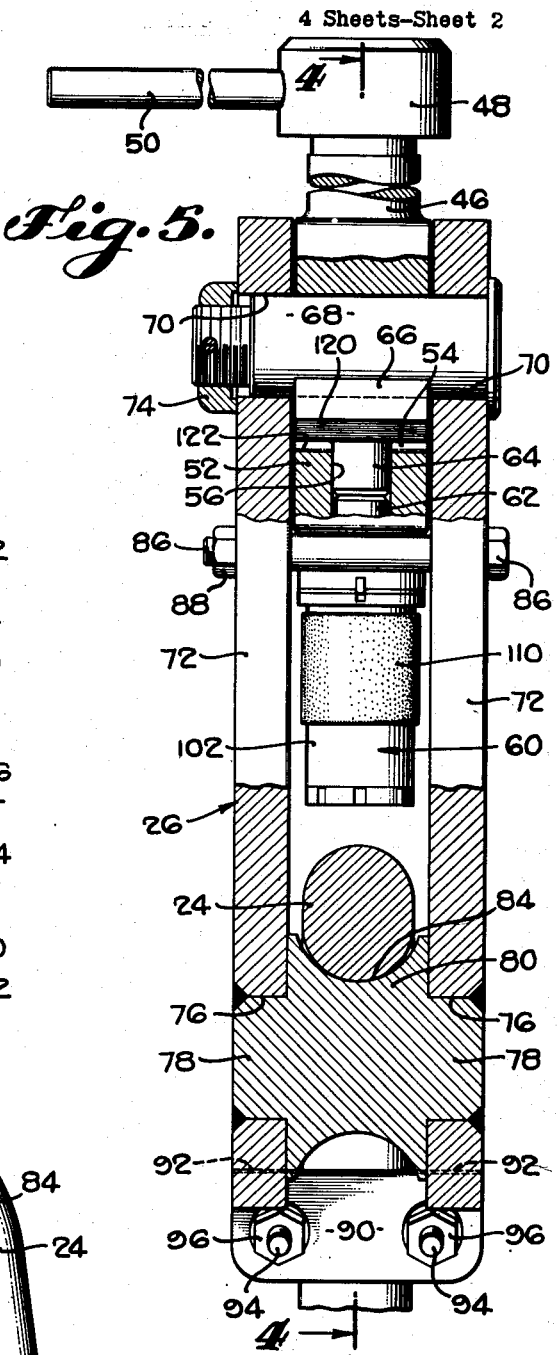

July 14, 1953           L. B. SCOTT           2,645,120
SWIVEL BAIL ADAPTER WEIGHT SENSING DEVICE
Filed April 29, 1949           4 Sheets-Sheet 3
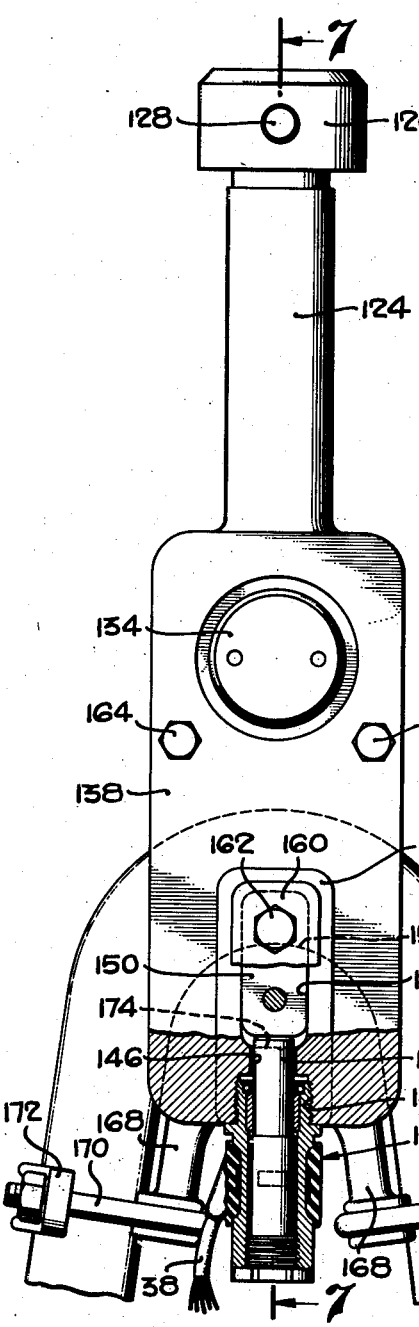
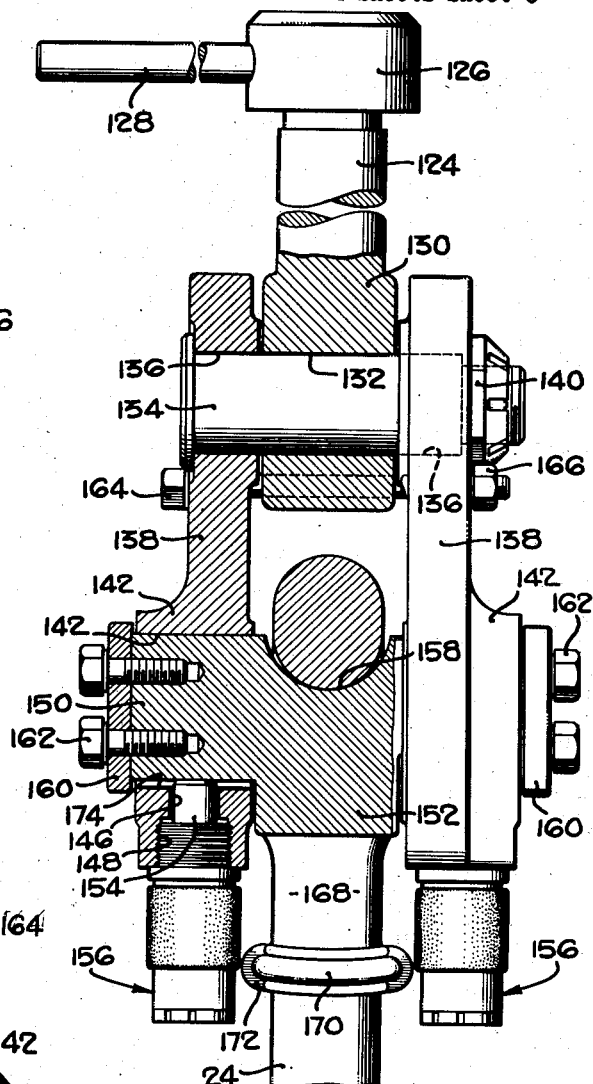
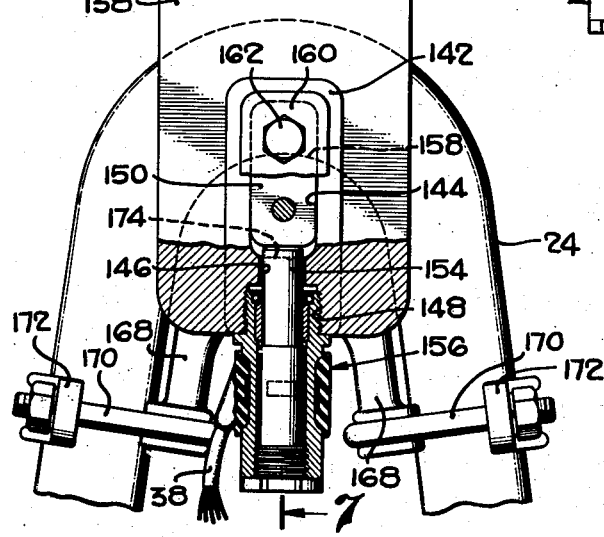
LYLE B. SCOTT,
INVENTOR.
BY
ATTORNEYS July 14, 1953     L. B. SCOTT     2,645,120
SWIVEL BAIL ADAPTER WEIGHT SENSING DEVICE
Filed April 29, 1949     4 Sheets-Sheet 4
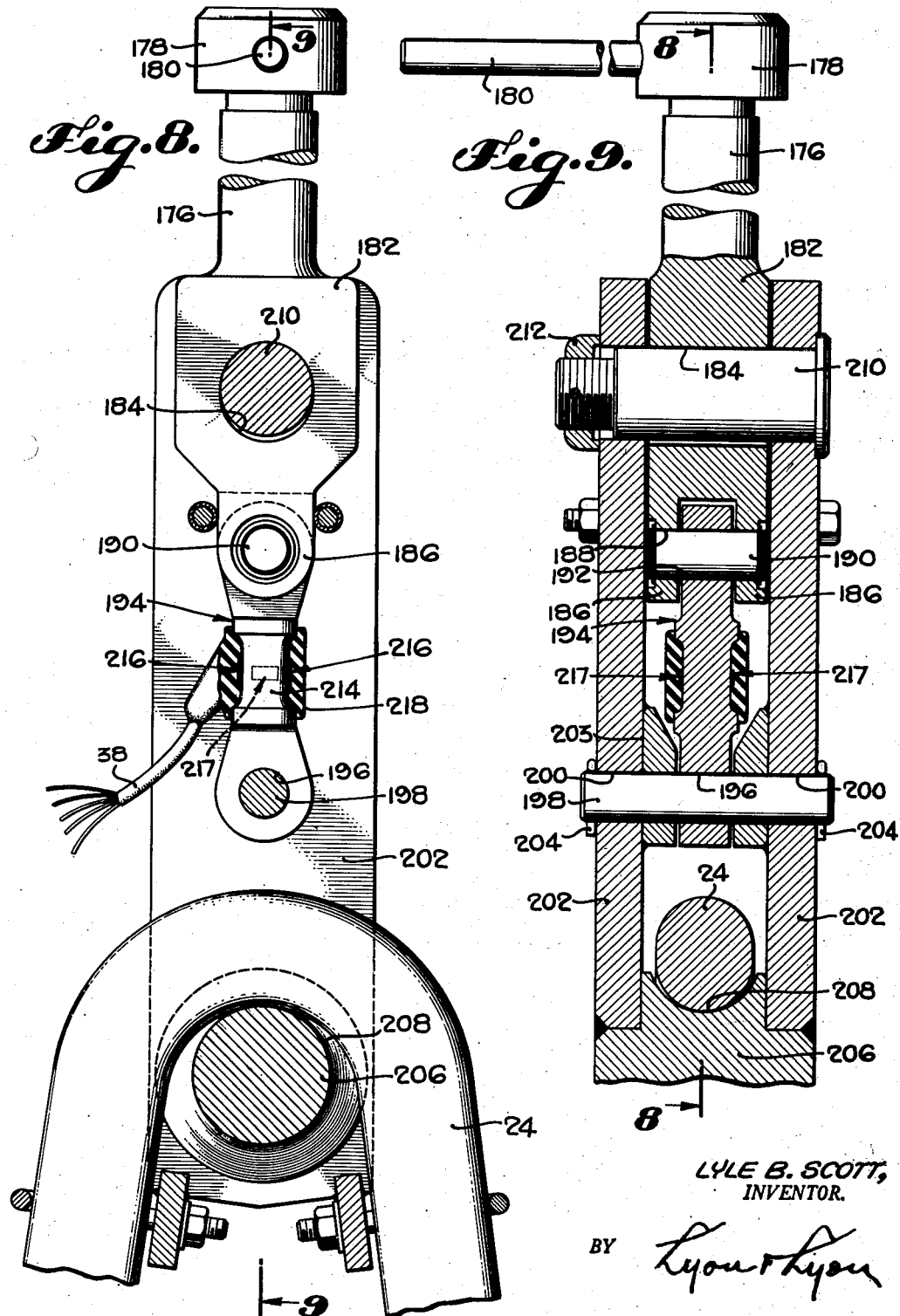
LYLE B. SCOTT,
INVENTOR.
BY *Lyon & Lyon*
ATTORNEYS Patented July 14, 1953

2,645,120

UNITED STATES PATENT OFFICE 2,645,120

SWIVEL BAIL ADAPTER WEIGHT SENSING DEVICE

Lyle B. Scott, South Gate, Calif., assignor to Byron Jackson Co., Vernon, Calif., a corporation of Delaware Application April 29, 1949, Serial No. 90,415

13 Claims. (Cl. 73—141)

This invention relates generally to weight sensing devices, and particularly to a weight sensing device for a swivel bail adapter.

In drilling an oil well with rotary drilling equipment, it is customary to suspend by drilling cable from the crown block atop the derrick what is called a traveling block. The traveling block in turn may carry a connector and from such connector is suspended an elevator. During drilling the purpose of the elevator is to support what is called a rotary swivel, which swivel rotatably carries the drill string, the drill string terminating in a drill bit which is rotated against the bottom of the hole to increase the length of the hole. In such an assembly where a connector and elevator are used, in order to adapt same to the bail of the rotary swivel, an adapter is interposed between said elevator and swivel, such adapter consisting generally of an upper means about which the elevator may be latched and a saddle section which carries the bail of the swivel.

During the rotation of the drill string and drill bit, it is desirable that the pressure of the drill bit against the formation be closely regulated. Such regulation is necessary to insure proper cutting of the formation, avoid crooked holes, and avoid damage to the drilling apparatus. If unsupported, the weight of the entire drill string would impart a pressure to the drill bit greater than could be used advantageously or even safely and consequently part of the weight of said drill string must be suspended. That the driller may know how much of the drill string is being supported and thus kept from pressing on the drill bit, it is necessary that some means for indicating the weight of such suspended portion of the drill string be provided.

Heretofore weight indicators have existed, such weight indicators usually consisting of devices operating on the principle of misaligning a portion of the stationary deadline end of the drilling cable so that the load tends to straighten out the misaligned portion, the force obtained from such straightening out being converted into sensible indications by hydraulic or mechanical means. Such hydraulic or mechanical indicators are subject to certain difficulties consisting of low sensitivity, excessive time lag and inaccuracies by virtue of vibrations, temperature changes and leakage. In a copending application for United States Letters Patent filed April 29, 1949, by Lyle B. Scott, entitled "Weight Sensing Device," Serial No. 90,414, there is disclosed and claimed a novel weight sensing device operating on the aforesaid misaligning principle but utilizing bonded wire resistance elements. This device, as with the former weight indicators, operates off the deadline portion of the drill cable, but it is desired that by the instant invention wire resistance elements be used to provide a weight sensing device directly applied to the swivel bail adapter, that is, the means used to connect the elevator and the rotary swivel.

However, in the attempt to apply such a weight sensing device directly to the swivel bail adapter, certain difficulties are presented. For example, as with all bonded wire resistance elements, it is desirable to bond same to a member which upon stressing is considerably strained. On the other hand, it is difficult to provide such a member which in the ordinary swivel bail adapter would be a load-carrying member and still preserve the factors of safety requisite to a swivel bail adapter in a drilling rig. Again, from the standpoint of economics, it is also desirable that such bonded wire resistance elements be bonded to a small member and not a large member of the type present in the main section of the usual adapter. And yet again it is desirable that the elements and the member to which they are bonded be detachable from the adapter itself so that but one such type weight sensing device be needed per rig, regardless of whether several different swivel bail adapters be alternately used. And finally, as in the weight sensing device of the above-entitled application for letters patent, it is necessary for accuracy that the elements be bonded to a member under tension.

Consequently, it is the principal object of this invention to provide a novel means for accurately sensing weights and the like in the oil well drilling art.

It is another principal object of this invention to provide a weight sensing device in assembly with the swivel bail adapter.

Another object is to provide such swivel bail adapter weight sensing device with bonded wire resistance elements.

A further object is to provide a specially constructed swivel bail adapter having incorporated therein bonded wire resistance elements in a manner to be responsive to the weight supported by the adapter.

An additional object is to provide such a swivel bail adapter having weight sensing means, the use of which will not effect a reduction in the safety factor of the adapter.

And yet another object is to provide a swivel bail adapter and weight sensing means such that said weight sensing means are readily detachable from the swivel bail adapter and are transferable to a similar swivel bail adapter of a different size.

Further objects of the invention will appear hereinafter.

In the drawings:

Figure 4 is a front elevational view of the preferred embodiment of the device, partly in section, along the line 4—4 of Figure 5;

Figure 5 is a side elevational view thereof, partly in section, along the line 5—5 of Figure 4;

Figure 6 is a front elevational view, partly in section, of a second embodiment of this invention;

Figure 7 is a side elevational view of a portion thereof, taken in section along the line 7—7 of Figure 6;

Figure 8 is a front elevational view of a third embodiment of the invention, taken partly in section along the line 8—8 of Figure 9;

Figure 9 is a side elevational view of such modification taken in section along the line 9—9 of Figure 8.

Figure 1:
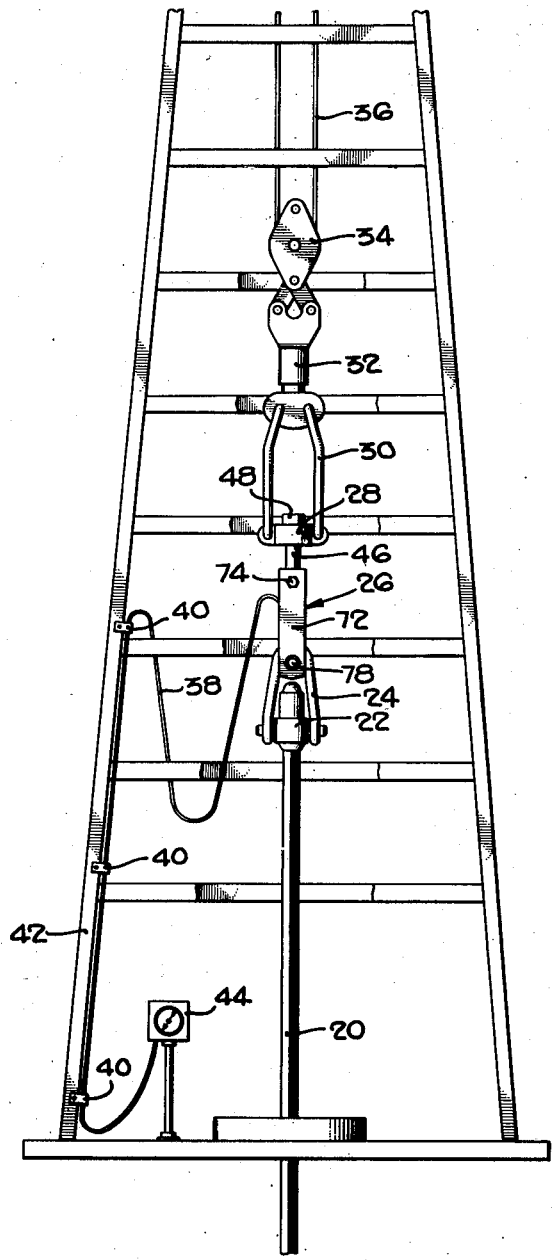
Figure 1 is a schematic view in side elevation of a derrick in which a weight sensing device has been installed in a swivel bail adapter according to this invention.

Referring to the drawings, Figure 1 shows a conventional oil well drilling apparatus wherein a drill string 20 carrying a drill bit (not shown) is supported by a rotary swivel 22, the bail 24 of which is carried by a specially constructed combined swivel bail adapter and weight sensing device 26 which itself is supported by an elevator 28. The elevator 28 is supported by links 30 which connect to a connector 32. The connector 32 is supported by the traveling block 34, said traveling block 34 being suspended by the drilling cable 36. A conductor cable 38 extends from the swivel bail adapter weight sensing device 26 through fastening means 40 on the derrick 42 to a suitable indicating and/or recording instrument 44 located near the driller's position.

The construction of the swivel bail adapter weight sensing device 26 broadly contemplates the providing of an upper shank portion or support member to which the elevator 28 may be connected, a lower saddle portion or load-carrying member to which the swivel bail 24 is connected, an intermediate load-transferring member extending from said saddle means to said shank, and a device to which are bonded wire resistance elements interposed between such intermediate load-transferring members and either the said shank or the said saddle means.

Referring particularly to the preferred embodiment disclosed in Figures 4 and 5, there is shown a shank 46 having a head 48 providing a shoulder means to engage the elevator 28, there being a bar member 50 extending from the head 48 which engages the elevator in well known manner to prevent rotation of the adapter with respect to the said elevator. The shank 46 is integral with a body member 52 which is provided with an opening 54 and which is provided with a bore 56 and a threaded counterbore 58. Threaded into the counterbore 58 is a bonded wire resistance strain gauge device or capsule 60 which will hereinafter be described and from which, through the bore 56, extends a shank 62 and a plunger 64, the said plunger 64 being integral with a saddle section 66 disposed in the opening 54.

Extending through the opening 54 and adapted to be supported by the saddle section 66 is a beam element or pin 68. Such pin also extends through bores 70 in the intermediate load-transferring member or upstanding side plates 72 and is secured with respect thereto by the nut 74. Said side plates 72 are provided with aligned bores 76 in their lower portions which receive the cylindrical projections 78 of the saddle 80, said cylindrical projections being welded to the side plates. The saddle 80 carries the rotary swivel 22 by its bail 24 in the groove 84. As is obvious, in the assembly of the adapter, the swivel bail 24 is placed upon the groove 84 of the saddle 80 by slipping same over and between the side plates 72 prior to the said side plates being assembled to the body member 52 and shank 46, which is done by inserting the pin 68 through the bores 70 and body opening 54. Bolts 86 are inserted through holes drilled in the side plates 72, are retained therein by nuts 88 and serve to render said side plates rigid with respect to each other and limit by clamping the pivoting of the said side plates about the pin 68 when the device is not in use. In order to restrain the swivel bail adapter against tilting relative to the swivel bail, a pair of plates 90 are welded in slots 92 formed in the lower edges of the side plates 72 and extend between the said plates. Such plates 90 are drilled to receive the U-bolts 94 which are clamped about the swivel bail 24 by the nuts 96.

It will thus be seen that the suspension of the weight of the drill string is by the rotary swivel, its bail 24, the saddle 80, the side plates 72, the pin 68, the saddle 66 and hence through the bonded wire strain gauge device or capsule 60, the body 52, shank 46 and elevator 28. The strain gauge capsule 60, which as herein constructed is easily removable by unthreading same from the counterbore 58 of the body 52, includes the shank 62 which is abutted by and carries the plunger 64 and which has a threaded extremity 98. The said threaded extremity 98 of the shank 62 is threaded into the threaded bore 100 of a cylindrical sleeve 102, said cylindrical sleeve 102 having a threaded extremity threaded as heretofore described into counterbore 58 and having a reduced shank portion 104 upon which are mounted the bonded wire resistance elements 106. In order to protect the strain gauges from oil, water, and mechanical damage, a protective layer of rubber 110 is bonded to the reduced shank 104. In addition, an oil seal 112 and a bushing 114 are secured within counterbores 116 and 118, respectively, to prevent the entry of moisture into the annular space separating shank 62 and the inner surface of sleeve 102.

Figure 3:
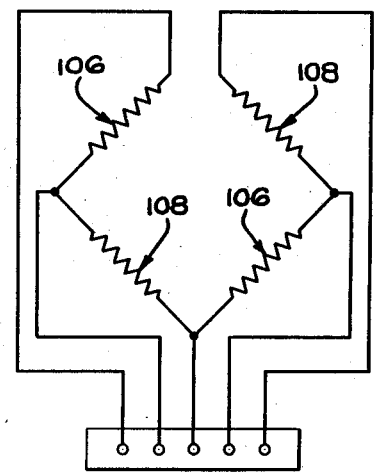
Figure 3 is a wiring diagram showing the manner in which the bonded wire resistance elements are electrically connected.
Figure 2:
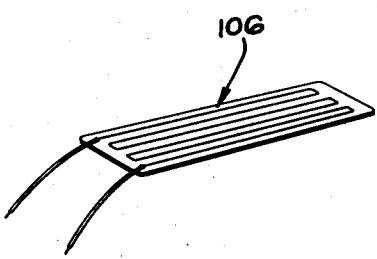
Figure 2 is a perspective view of one of the bonded wire resistance elements.

The electrical circuit of the elements is shown in Figure 3 and is in the form of a Wheatstone bridge. Elements 106 are bonded 180° apart on the circumference of the reduced shank 104 with their filaments parallel to the axis of the shank 62. Elements 108 are bonded to said reduced shank 104 180° apart but in a circumferential path and with their filaments perpendicular to the elements 106. Hence the weight of the drill string, which as heretofore described is supported by the side plates 72, pin 68 and saddle 66, produces a compressive force on the plunger 64 and shank 62, which force, by virtue of the connection of the said shank 62 with the sleeve 102, is transmitted to tension in the said sleeve 102.

Such tension imparts a tensile strain to the reduced shank portion 104 of the sleeve and results in a lengthening of the filaments in the elements 106 and a consequent increase in their resistance. Correspondingly, it results in a shortening of the filaments in the elements 108 due to necking of the reduced shank 104 and a consequent lowered resistance. As the elements 106 and 108 are on opposite legs of the Wheatstone bridge, the respective increases and decreases in resistance are cumulative and a sensible indication of such resistance change appears on the indicating and recording instrument 44. Such indicating and recording instrument 44 is calibrated in terms of weight.

It will be immediately observed, therefore, that the capsule 60 is directly interposed in the path of the entire load of the drill string. It will be further noted that such load is entirely transmitted through the reduced shank portion 104 of the sleeve 102. This is made necessary by the desirability of, first, providing the member to which the elements are bonded in a state of tensile strain for uniformity of strain and, second, providing such member of very slight cross-section in order that the accuracy and sensitivity of the weight sensing device be increased. However, inasmuch as the small capsule 60 cannot have the property of strength in the amount possible in a larger member, the invention provides the load-bearing surfaces or shoulders 120 on the saddle section 66 which, in normal operation of the device, are a slight distance above the load-bearing surface of seat 122 of the opening 54 in the body 52. In the event of rupture of the capsule 60, the saddle section 66 will lower until these complementary surfaces engage, and the load transfer is thereby direct from the pin 68 through the saddle section 66 to the body 52 and shank 46.

It will thus be seen that the invention comprises not only a swivel bail adapter particularly adapted to the use of bonded wire resistance elements but a bonded wire resistance strain gauge capsule which is easily removed from the adapter and replaced in another similar adapter. The intermediate load-transferring member and co-operating beam element operate to facilitate the incorporation of the strain gauge capsule in the entire unit and further make possible the easy assembly and disassembly of said unit. And finally, by reason of the provision of engageable complementary load-bearing surfaces on those members between which is interposed the strain gauge capsule, the invention provides no loss whatsoever in the safety factors always to be considered in drilling operations. Should the capsule fail by virtue of the limited size of its elements, the weight is immediately transferred directly to the body of said adapter, and no danger of release of the swivel bail and drill string can exist.

Referring now to the embodiment disclosed in Figures 6 and 7, there is shown a shank 124 having a head 126 providing a shoulder means to engage the elevator 28, there being a bar member 128 extending from the head 126 which engages the elevator in a well known manner as to prevent rotation of the adapter with respect to the said elevator. The shank 124 is integral with a body member 130 having a bore 132 adapted to receive a pin 134. The pin 134 passes through the bore 132 and also through aligned bores 136 in the side plates 138, being retained therein by a nut 140. Identical bosses 142 are formed on the lower portions of each of the side plates 138. Said bosses are provided with rectangular transverse openings 144, longitudinal bores 146 and threaded counterbores 148. Lateral extensions 150 of the saddle 152 extend into said rectangular transverse openings 144 and are supported by the plungers 154 extending from the bonded wire resistance strain gauge device or capsules 156, said capsules 156 being identical in all respects and being threaded into the longitudinal counterbores 148. The capsules 156 are substantially identical to the hereinbefore described capsule 60, being of smaller size however and being electrically connected in such manner that their combined output is transmitted through the conductors 38 to the indicating instrument 44. As with the saddle 80, the saddle 152 is provided with a groove 158 which receives the bail 24 of the rotary swivel 22. Retainer plates 160 are secured to lateral extensions 150 of the saddle 152 by the bolts 162 and are provided in order to add rigidity to the structure and limit outward movement of the side plates 138. Bolts 164 are inserted through holes drilled through side plates 138, are retained therein by nuts 166 and serve to limit by clamping the pivoting of said side plates about the pin 134 when the device is not in use. In order to restrain the swivel bail adapter against tilting relative to the swivel bail, a pair of arms 168 having grooved lower extremities depend from the saddle 152, there being U-bolts 170 supported in said grooved extremities and connected to the clamping plates 172 about the swivel bail 24.

In this embodiment it will be seen that the suspension of the drill string is by the rotary swivel, its bail 24, the saddle 152 and hence through the bonded wire strain gauge assemblies or capsules 156 to the side plates 138, the shank 124, the body member 130, shank 124 and elevator 28. The strain gauge capsules 156 as heretofore stated are substantially identical to the capsule 60 and comprise the plungers 154 which are threaded into sleeves having reduced shank portions to which are bonded the wire resistance elements, the sleeves themselves being threaded into the bosses 142. Again as with the preferred embodiment, the strain gauge carrying elements are directly in the path of the entire load of the drill string and are in tension. Again, since such elements are small, there must be provision for the necessary safety factor, and this is provided by the lateral extremities 150, the bottom surfaces of which rest upon the plungers 154 slightly above the seats 174 in the rectangular transverse openings 144 of the bosses 142. In the event of rupture of the capsules 156, the saddle 152 will lower until the lateral extremities 150 engage the seats 174, the load transfer being thereby direct from the saddle to the bosses of the side plates 138.

Finally referring to the third embodiment disclosed in Figures 8 and 9, there will be seen the shank 176 having a head 178 for engagement with the elevator 28, a bar 180 extending from such head 178 to prevent relative rotation between adapter and elevator. The shank 176 is integral with a body 182, which body is provided with a central bore 184 and lower bifurcated ears 186. The ears 186 have aligned bores 188 for receiving a pin 190 which also passes through an upper bore 192 in the wire resistance strain gauge link 194. The lower portion of such link 194 is also provided with a lower bore 196 through which extends a pin 198, the pin 198 passing through aligned bores 200 of the side plates 202 and the centering bosses 203 and being secured therein by cotter pins 204. Supported by the lower portions of the side plates 202 is a saddle 206 which saddle may be carried by said side plate in the same manner as in the preferred embodiment originally described, such saddle having a groove 208 to receive the bail 24 of the swivel. The upper portions of the side plates 202 are provided in turn with aligned bores through which extends a pin 210 secured by a nut 212, said pin 210 also passing through the bore 184 of the body 182 but having a smaller diameter than said bore. The same arrangement of nuts, bolts and clamping means may be utilized to render this structure rigid as was utilized in the preferred embodiment hereinbefore described. It will be seen that the weight of the drill string in this modification is transferred from the bail 24 to the saddle 206 and side plates 202 to the pin 198 and thence through the link 194 to the pin 190, the body 182 and shank 176. The link 194 is normally in tension and is provided with a reduced shank portion 214 to which are bonded the strain gauges 216 and 217, the respective pairs of strain gauges having their filaments parallel to the axis of the link and perpendicular thereto respectively and operating in the same manner as do the respective strain gauges of the capsule 60. In order to protect these strain gauges from oil, water and mechanical damage, a protective layer of rubber 218 is bonded to the reduced shank 214. Since the weight of the drill strain is transmitted directly through the link 194 and thus through the reduced shank portion 214 to which is bonded the wire resistance elements, a sensible weight indication will appear on the indicating and recording instrument 44. Again, due to the necessarily restricted size of the link 194 and cross-section of the reduced shank portion 214, a provision must be made to obtain the safety factors necessary in the equipment. The invention provides for such safety factor in the operation between the bottom of the pin 210 and the bottom of the bore 184 in body 182. As hereinbefore stated, the said bore 184 if of a larger diameter than the said pin 210 and thus normally when the weight of the drill strain is carried by the link 194 clearance exists between such members, and no part of the load is carried by the pin 210. On the other hand, should the link 194 rupture, the pin 210, which carries the side plates 202, would immediately drop to the bottom of the bore 184, thus providing a load transfer direct from the said side plates through the pin 210 to the body 182.

It will also be noted that whereas in the former two embodiments of the invention, the wire resistance strain gauge capsules were threadedly removable and exchangeable between adapters, the links 194 in the present embodiment are not so threaded. However, in the instant embodiment the strain gauge link is itself replaceable with equal facility inasmuch as the pins 198 and 210 are readily removable to permit a withdrawal of the body 182 and link 194, and the pin 190 is thereupon itself readily removable to permit withdrawal of the said link 194.

While there has been described what is at present considered preferred embodiments of the present invention, it will be apparent to those skilled in the art that various modifications and changes may be made without departing from the essence of the invention, and it is intended to cover herein all such modifications and changes as come within the true scope and spirit of the appended claims.

I claim:

1. Load supporting and sensing apparatus comprising: an upper support member; a lower load-carrying member including a pair of transverse extensions; an intermediate load-transferring member comprising a pair of spaced tension elements connected adjacent their upper ends to said support member and having openings adjacent their lower ends adapted to receive said extensions; and a pair of load-responsive devices each having an element on which are mounted bonded wire resistance elements for sensing the load imposed upon said devices, each of said devices being operatively interposed between a respective tension element and a respective extension on said load-carrying member whereby said devices are adapted to normally maintain the lower surfaces of said extensions spaced from the lower surfaces of said openings in said tension elements to thereby cause said devices to assume the load sustained by said load-carrying member, said surfaces being adapted to interengage and transfer the load directly therebetween independently of said load responsive devices in the event of structural failure of said devices.

2. A swivel bail adapter comprising: a shank member having a transverse opening and being adapted for supporting encirclement by an elevator; a swivel bail supporting member; an intermediate load-transferring member comprising a pair of spaced side plates and a pin connected to the upper ends thereof, said pin being supported within said transverse opening; and a load-responsive device operatively interposed between said shank member and said load-transferring member whereby said pin is normally held spaced from the lower surface of said transverse opening and whereby the load sustained by said swivel bail supporting member is imposed upon said load-responsive device, said device having bonded wire resistance elements mounted on one portion thereof for sensing said load, said pin being adapted, upon structural failure of said device, to engage the lower surface of said opening to thereby transfer the load from said swivel bail supporting member directly to said shank member independently of said device.

3. A swivel bail adapter comprising: a shank member adapted to be encircled and supported by an elevator; a swivel bail supporting member having a pair of lateral extensions; a pair of spaced side plates connected adjacent their upper ends to said shank member and having openings adjacent their lower ends adapted to receive said extensions; and a pair of load-responsive devices each having a portion on which are mounted bonded wire resistance elements for sensing the load imposed upon each said devices, one of each said devices being operatively interposed between a respective side plate and a respective extension on said swivel bail supporting member whereby said devices are adapted to normally maintain the lower surfaces of said extensions spaced from the lower surfaces of the openings in said side plates to thereby cause said devices to assume the load suspended from said swivel bail supporting member, said surfaces being adapted to interengage and transfer the load directly therebetween independently of said load-responsive devices upon structural failure of said devices.

4. Load supporting and measuring apparatus comprising: a support member having a transverse opening and a longitudinal bore formed therebelow intersecting said opening; a load carrying member; a pair of intermediate spaced tension elements connected adjacent their upper ends to said support member by a beam element supported within said opening, said tension-ele-